US012722543B2

(12) United States Patent
Kim

(10) Patent No.: US 12,722,543 B2
(45) Date of Patent: Sep. 1, 2026

(54) BRAKE DEVICE OF RECLINER FOR VEHICLE SEAT

(71) Applicant: Hyundai Transys Inc., Seosan-si (KR)

(72) Inventor: Won Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 315 days.

(21) Appl. No.: 18/493,046

(22) Filed: Oct. 24, 2023

(65) Prior Publication Data

US 2024/0157857 A1 May 16, 2024

(30) Foreign Application Priority Data

Nov. 14, 2022 (KR) ........................ 10-2022-0152043

(51) Int. Cl.
*B60N 2/22* (2006.01)

(52) U.S. Cl.
CPC .................................. *B60N 2/2227* (2013.01)

(58) Field of Classification Search
CPC .................................................... B60N 2/2227
See application file for complete search history.

(56) References Cited

U.S. PATENT DOCUMENTS 6,543,849 B1 * 4/2003 Yamada ................. B60N 2/236 297/363
8,789,677 B2 * 7/2014 Krueger ................. B60N 2/938 192/223
9,051,978 B2 * 6/2015 Karthaus ............... F16D 41/064
10,682,929 B2 * 6/2020 Costantino ............. B60N 2/233
11,267,374 B2 * 3/2022 Zelmanov ............ B60N 2/2362
12,263,763 B2 * 4/2025 Kim ..................... B60N 2/2227
12,365,269 B2 * 7/2025 Kim ....................... B60N 2/168
2003/0227205 A1 * 12/2003 Villarroel ................. B60N 2/22 297/354.12
2012/0280555 A1 * 11/2012 Blinzler ............... B60N 2/2356 297/463.1
2024/0166094 A1 * 5/2024 Lee ...................... B60N 2/2257

FOREIGN PATENT DOCUMENTS

DE 4317150 C1 10/1994
DE 19616680 A1 11/1997
DE 102008028086 A1 12/2009

(Continued)

OTHER PUBLICATIONS

Simon Jazbec, “Extended European Search Report for EP Application No. 23206107.7”, Apr. 26, 2024, EPO, Germany.

*Primary Examiner* — Timothy J Brindley

(74) *Attorney, Agent, or Firm* — Bridgeway IP Law Group, PLLC; Jihun Kim

(57) ABSTRACT

A brake device of a recliner for a vehicle seat includes: a housing having a through-hole through which a shaft of a seat recliner passes and a key portion formed toward the inside thereof; a fixture provided in an accommodation space of the housing, through which the shaft penetrates, supported upwards by a spring, and configured to be prevented from rotating by engagement of a protrusion portion and the key portion while being supported upwards; and a release lever installed above the fixture to be coupled to the shaft and configured to preferentially rotate, when a rotational force is applied from the outside, the shaft and enable rotation of the shaft and the fixture.

14 Claims, 9 Drawing Sheets

(56) References Cited

FOREIGN PATENT DOCUMENTS

| | | | | | |
|---|---|---|---|---|---|
| JP | H07-042344 | Y2 | | 10/1995 | |
| KR | 10-0812232 | B1 | | 3/2008 | |
| KR | 101200154 | B1 | * | 11/2012 | ............... B60N 2/20 |
| KR | 10-1702780 | B1 | | 2/2017 | |
| KR | 102071474 | B1 | * | 1/2020 | ........... B60N 2/2227 |

* cited by examiner

BRAKE DEVICE OF RECLINER FOR VEHICLE SEAT

CROSS-REFERENCE TO RELATED APPLICATION(S)

This application is based on and claims priority under 35 U.S.C. 119 to Korean Patent Application No. 10-2022-0152043, filed on Nov. 14, 2022, in the Korean Intellectual Property Office, the disclosure of which is herein incorporated by reference in its entirety.

TECHNICAL FIELD

The present disclosure relates to a brake device of a recliner for a vehicle seat and, more specifically, to a brake device of a recliner for a vehicle seat, which enables rotation of the recliner when a forward input of rotational force is applied to a release lever and prevents the rotation of the recliner when a rotational force is applied to a shaft in the state in which the vehicle seat is fixed, thereby improving locking force.

BACKGROUND

In general, the seat of a vehicle includes a seat cushion installed to support the load of an occupant and move forward and backward with respect to the interior floor, thereby supporting the lower body of the occupant, and a seatback installed rotatable at a certain angle with respect to the seat cushion, thereby supporting the upper body of the occupant.

This seat is equipped with a sliding device that allows the driver or passenger to adjust the front and rear position of the seat by pulling or pushing the seat cushion forward and backward so as to conform to their body shape and a recliner for variably adjusting the inclination angle of the seatback with respect to the seat cushion to obtain the most comfortable posture when sitting on the seat.

In particular, the recliner has a problem in which the inclination angle of the seatback changes due to repetitive load transmitted to the seatback by the occupant in the state where the inclination angle of the seatback is adjusted with respect to the seat cushion, and thus, in order to solve this problem, a recliner having a brake unit including a brake drum separately mounted to the outside of the recliner has been introduced.

However, in the conventional recliner equipped with an external brake unit described above, the braking force of the recliner is generated through friction between metal materials. This is based on the principle in which when the user applies rotational force from the outside, the friction force is released to enable reclining of the seat and in which when a reverse input of external force is applied from the seatback due to vibration or road impact while driving the vehicle, a braking force is generated to prevent the reclining of the seat.

Such a brake device of the recliner generates braking force by friction between metals, and may thus require an increased number of parts for generation of the braking force or may cause operational problems (i.e. noise, vibration, harshness) depending on the product.

Accordingly, there is a need for a method to generate locking force through engagement and release, instead of generating braking force by friction, in the brake device of a recliner and to further improve locking performance.

The foregoing described as the background art is intended merely to aid in the understanding of the background of the present disclosure, and is not intended to mean that the present disclosure falls within the purview of the related art already known to those skilled in the art.

SUMMARY

The present disclosure is to provide a brake device of a recliner for a vehicle seat, which enables the rotation of the recliner when a forward input of rotational force is applied to a release lever and prevents the rotation of the recliner when a rotational force is applied to a shaft in the state in which the vehicle seat is fixed, thereby improving locking force.

The technical subjects pursued in the present disclosure may not be limited to the above-mentioned technical subjects, and other technical subjects which are not mentioned may be clearly understood, through the following descriptions, by those skilled in the art to which the present disclosure pertains.

In accordance with an aspect of the present disclosure, there is provided a brake device of a recliner for a vehicle seat, which includes: a housing having a through-hole through which a shaft of a seat recliner passes, an accommodation space formed therein, and a key portion formed toward the inside thereof; a fixture provided in the accommodation space of the housing, through which the shaft penetrates, supported upwards by a spring, having a protrusion portion formed on the outer side thereof, and configured to be prevented from rotating by engagement of the protrusion portion and the key portion while being supported upwards; and a release lever installed above the fixture to be coupled to the shaft and configured to preferentially rotate, when a rotational force is applied from the outside, the shaft and press the fixture downwards so as to release the engagement of the protrusion portion and the key portion, thereby enabling rotation of the shaft and the fixture.

For example, the central portion of each side of the release lever may be formed to protrude toward the shaft.

For example, the corners of respective sides of the release lever may be formed to protrude toward the shaft.

For example, a rotation hole may be formed in the center of the release lever so as to allow the shaft to pass therethrough.

For example, the rotation hole may be formed in a rectangular shape having a different size from the shaft so as to enable rotation of the shaft at a certain angle.

For example, when a rotational force is applied from the outside, the rotation hole of the release lever may come into contact with the shaft while the fixture is stationary so that the shaft may rotate relative to the fixture.

For example, when external pressure is applied to the shaft, the shaft may preferentially come into contact with the rotation hole of the release lever while the fixture is stationary, and then the protrusion portion may engage with the key portion to be prevented from rotating.

For example, each side of the release lever may be provided with a movement allowance space where the shaft is movable, and when a rotational force is applied from the outside, the shaft may rotate into the movement allowance space to be regulated in the position of the shaft.

For example, each side of the fixture may be spaced apart from each side of the shaft.

For example, a plurality of key portion may protrude inwards from the inner circumferential surface of the housing and may be spaced apart from each other in the circumferential direction thereof.

For example, a pressing portion may extend downwards from the release lever, and when the release lever rotates, the pressing portion may press the fixture downwards to move the fixture downwards.

For example, a side end of the pressing portion may come into contact with the fixture, and an inclined portion may be formed on the side end so as to become narrower in width from top to bottom, and the fixture may be pressed by the inclined portion of the pressing portion to move downwards.

For example, an inclined hole may be formed in the fixture, and the pressing portion may be inserted into the inclined hole, and when the release lever rotates in the state in which the pressing portion is inserted into the inclined hole, the inclined portion of the pressing portion may press the side end of the inclined hole to move the fixture downwards.

For example, the pressing portion may press the fixture downwards such that the protrusion portion is released downwards from the key portion, thereby enabling rotation of the fixture and shaft.

For example, a rotating portion may be formed to extend downwards from the pressing portion of the release lever, and the fixture may be pressed by the pressing portion of the release lever to be lowered and may rotate by being pressed by the rotating portion in the lowered state.

According to the brake device of a recliner for a vehicle seat of the present disclosure, it is possible to enable the rotation of the recliner when a forward input of rotational force is applied to a release lever and prevent the rotation of the recliner when a rotational force is applied to a shaft in the state in which the vehicle seat is fixed, thereby improving locking force.

Advantageous effects obtainable from the present disclosure may not be limited to the above mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
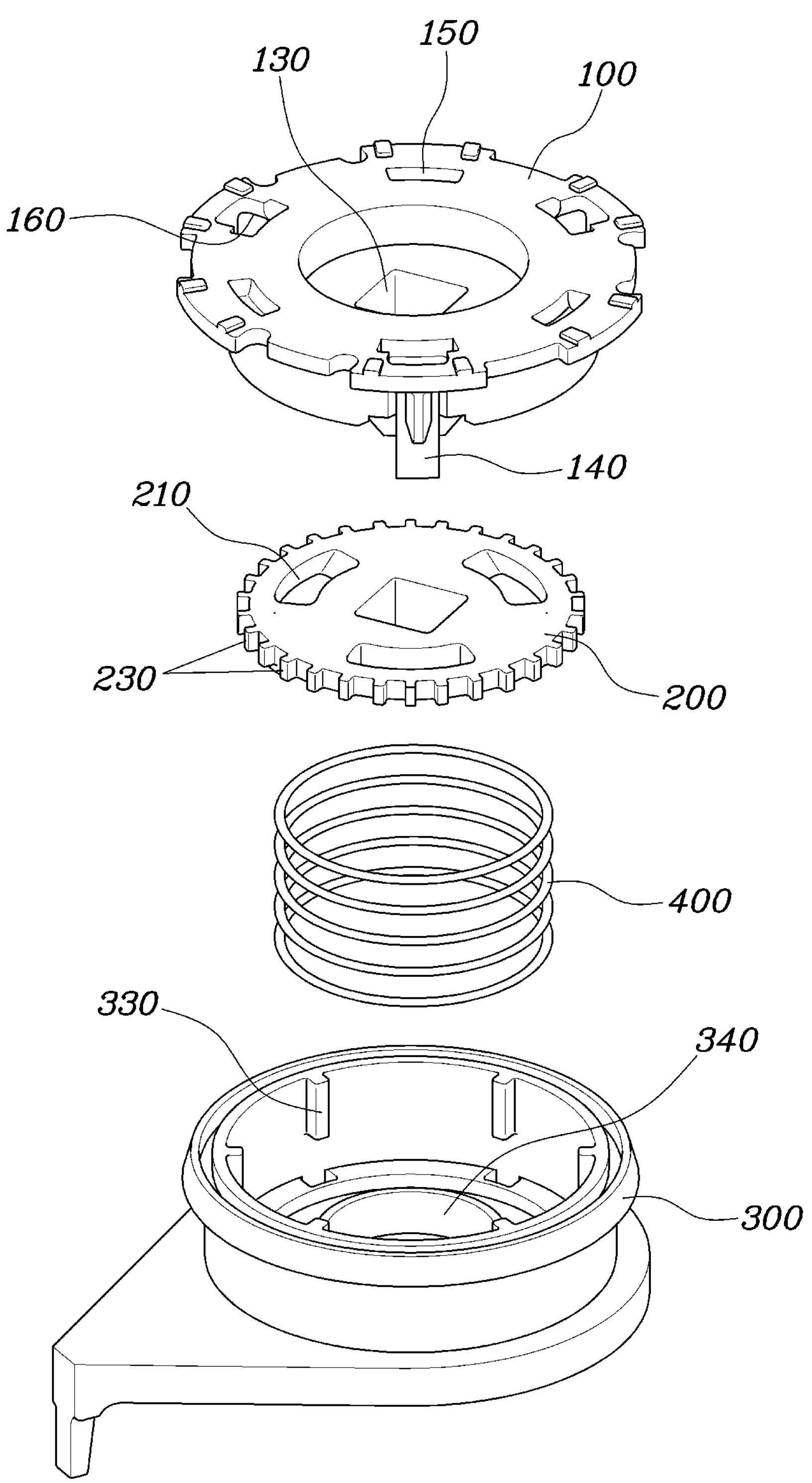
FIG. 1 is a diagram illustrating a brake device of a recliner for a vehicle seat according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms “module” and “unit” used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure. Terms including an ordinal number such as “first”, “second”, or the like may be used to describe various elements, but the elements are not limited to the terms. The above terms are used only for the purpose of distinguishing one element from another element.

In the case where an element is referred to as being “connected” or “coupled” to any other element, it should be understood that another element may be provided therebetween, as well as that the element may be directly connected or coupled to the other element. In contrast, in the case where an element is “directly connected” or “directly coupled” to any other element, it should be understood that no other element is present therebetween.

A singular expression may include a plural expression unless they are definitely different in a context.

As used herein, the expression “include” or “have” are intended to specify the existence of mentioned features, numbers, steps, operations, elements, components, or combinations thereof, and should be construed as not precluding the possible existence or addition of one or more other features, numbers, steps, operations, elements, components, or combinations thereof.

FIG. 1 is a diagram illustrating a brake device of a recliner for a vehicle seat according to an embodiment of the present disclosure. FIG. 1 is provided based on the components related to this embodiment, but the actual brake device of a recliner for a vehicle seat may be implemented by including fewer or more components.

Referring to FIG. 1, the brake device of a recliner for a vehicle seat according to an embodiment may include a release lever 100, a fixture 200, a housing 300, and a spring 400.

First, the housing 300 may be formed with a through-hole 340 through which a shaft 500 of the seat recliner passes. The shaft 500 is a long member that is inserted where the vehicle seat and the seatback are connected so that the recliner function of the vehicle seat operates to adjust the seatback.

The housing 300 is provided inside the vehicle recliner and may be configured in a dense structure with integrated functions by disposing the fixture 200, the spring 400, and the housing 300, which will be described later, in an accommodation space formed on the inside thereof. In addition, the housing 300 has key portions 330 formed inward to be engaged with the fixture 200. A plurality of key portions 330 may be formed to protrude inward from the inner circumferential surface of the housing 300 so as to be spaced apart from each other at equal intervals in the circumferential direction. As will be described later, the key portion 330 may be formed to have a predetermined length on the inside of the housing 300 and may not be formed in the lower portion thereof such that the protrusion portion 230 is released from the key portion 330 by the release lever 100 when rotational force is applied from the outside.

The fixture 200 is accommodated in the accommodation space of the housing 300 so as to be coupled to the shaft 500. The fixture 200 is coupled to the shaft 500 through a fixing hole 220 formed in the center of the fixture 200 and is pressed by an inclined portion 141 of the pressing portion 140, which will be described later, through a plurality of inclined holes 210 formed at equal intervals in the circumferential direction based on the center of the fixture 200. The fixing hole 220 of the fixture 200 may be formed to have the same polygonal cross-section as the shaft 500 such that the shaft 500 may pass through the fixing hole 220.

In addition, the spring 400 may serve to support the fixture 200 upwards so that the fixture 200 may return in the upward direction to the original position when the rotational force is not applied to the release lever 100. Protrusion portions 230 may be formed on the outer surface of the fixture 200 so as to be engaged with the key portions 330 of the housing 300. When the protrusion portions 230 and the key portions 330 are engaged with each other while the fixture 200 is supported upwards, the rotation of the fixture 200 is prevented, and as the rotation of the fixture 200 is prevented, the relative rotation of the shaft 500 is also prevented.

Here, a plurality of protrusion portions 230 may be formed in the fixture 200 and a plurality of key portions 330 may be formed in the housing 300, and even when some of the protrusion portions 230 or key portions 330 are damaged, the remaining protrusion portions 230 and key portions 330 may be engaged with each other to prepare for an emergency situation. In addition, since the number of protrusion portions 230 formed is smaller than the number of key portions 330, it may be easy for the protrusion portion 230 and the key portion 330 to engage with each other by pressing of the release lever 100.

Figure 2:
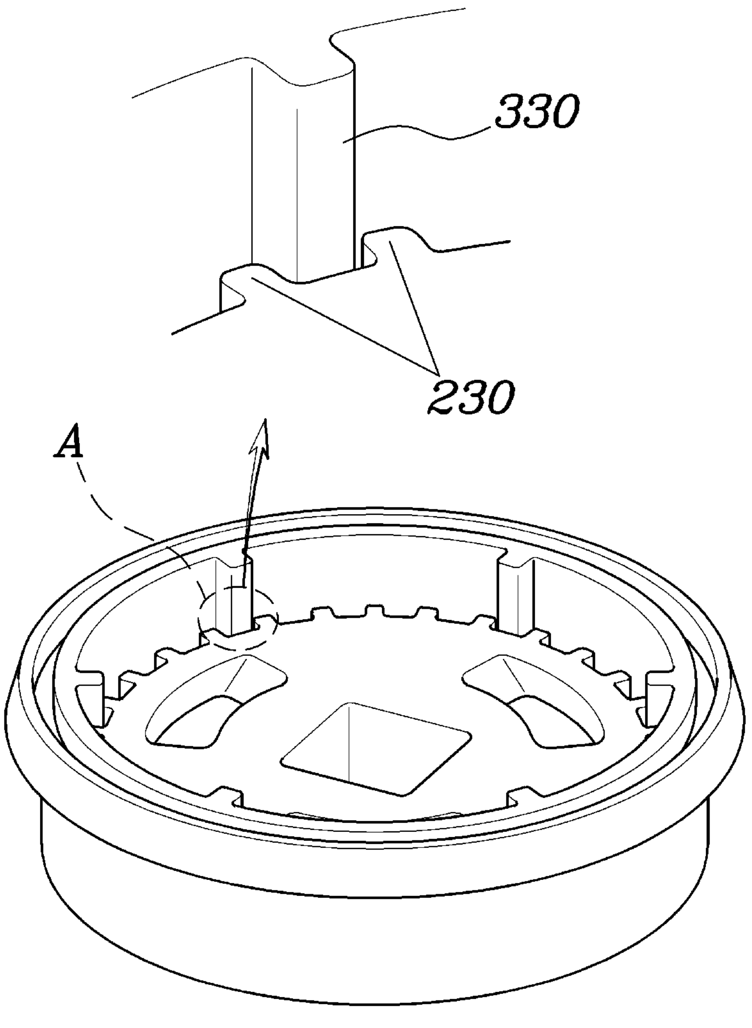
FIG. 2 is a diagram illustrating the shapes of a key portion and a protrusion portion according to an embodiment of the present disclosure.

In addition, the key portion 330 and the protrusion portion 230 may have outer surfaces formed in a spherical shape. FIG. 2 is a diagram illustrating the shapes of a key portion 330 and a protrusion portion 230 according to an embodiment of the present disclosure. Referring to area A in FIG. 2, the key portion 330 and the protrusion portion 230 are engaged with each other to generate locking force to prevent relative rotation of the fixture 200 to the shaft 500. However, when the two parts are in contact with each other in a vertical direction, the key portion 330 and the protrusion portion 230 are not easily released from each other. Therefore, by applying a spherical shape to the outer surface where the key portion 330 and the protrusion portion 230 come into contact with each other, the contact area may be minimized, enabling easy engagement and release thereof.

In addition, the release lever 100 may be installed above the fixture 200 and press the fixture 200 downwards when rotational force is applied from the outside. When the fixture 200 is pressed downwards, the engagement of the protrusion portion 230 and the key portion 330 is released, allowing the fixture 200 and shaft 500 to rotate. A plurality of first levers 150 and a plurality of second levers 160 may be formed on the release lever 100 so as to be spaced apart from each other in the circumferential direction thereof. The first lever 150 and the second lever 160 may intersect each other to be spaced apart from each other so that a device for applying rotational force from the outside may be further installed on the outer side thereof.

Hereinafter, a process in which the fixture 200 is pressed downwards will be described.

Figure 3:
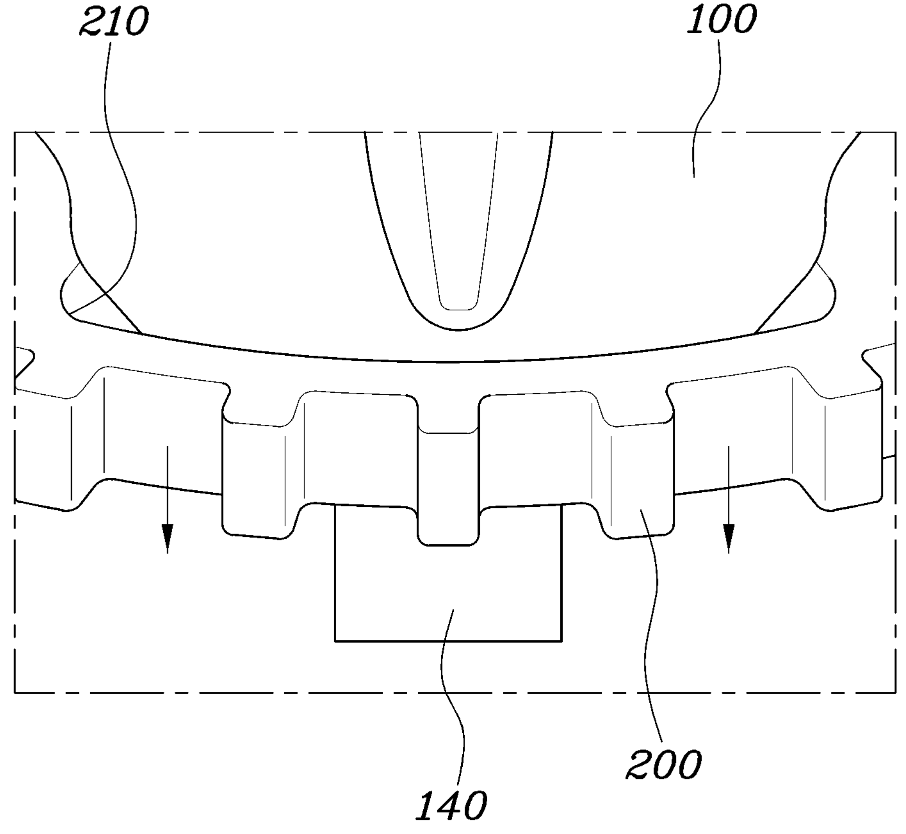
FIG. 3 is a diagram illustrating a state in which a fixture is pressed downwards by rotational force applied to a release lever according to an embodiment of the present disclosure.
Figure 4:
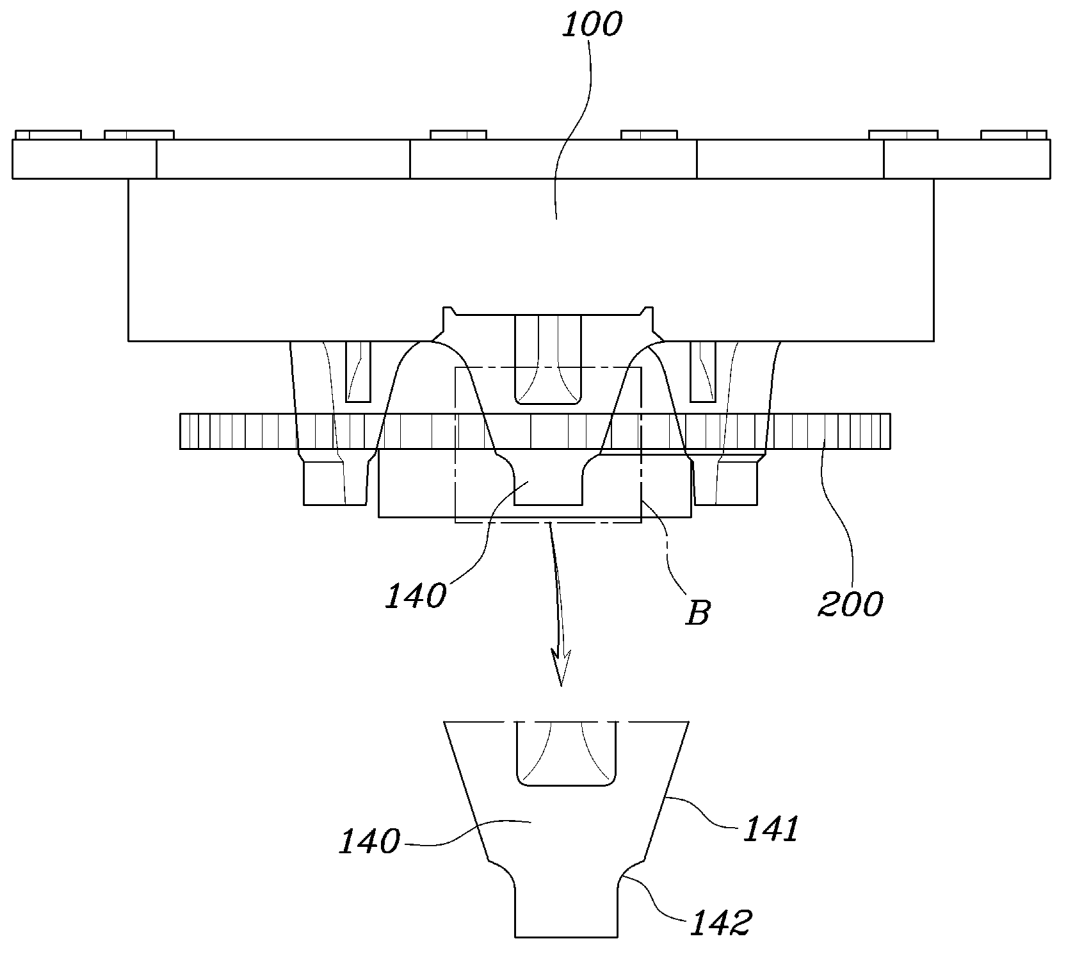
FIG. 4 is a diagram illustrating a pressing portion extending downwards from a release lever according to an embodiment of the present disclosure.

FIG. 3 is a diagram illustrating a state in which a fixture 200 is pressed downwards by rotational force applied to a release lever 100 according to an embodiment of the present disclosure, and FIG. 4 is a diagram illustrating a pressing portion 140 extending downwards from a release lever 100 according to an embodiment of the present disclosure.

Referring to FIG. 3, a pressing portion 140 may be formed to extend downwards from the release lever 100 so that when the release lever 100 rotates, the pressing portion 140 may press the fixture 200 downwards to move down. When a forward input of rotational force is applied from the outside, the fixture 200 may move down by the pressing portion 140 so that the engagement of the key portion 330 and the protrusion portion 230 is released to unlock the housing 300 and the fixture 200, enabling rotation of the shaft 500 so as to adjust the recliner.

This operation may be performed by an inclined portion 141 and a rotating portion 142 that constitute the pressing portion 140 of the release lever 100. Referring to area B in FIG. 4, it may be seen that an inclined hole 210 is formed in the fixture 200 and that the pressing portion 140 is inserted into the inclined hole 210. When rotational force is applied from the outside of the release lever 100 in the state where the pressing portion 140 is inserted into the inclined hole 210, the fixture 200 descends.

Specifically, the inclined portion 141 may constitute side ends of the pressing portion 140 and may be formed to become narrower in width from top to bottom along the inclined surface. As the pressing portion 140 descends, the inclined portion 141 comes into contact with the inclined hole 210, and accordingly, the side end of the inclined hole 210 is pressed laterally and downwards by the inclined portion 141 so that the fixture 200 moves downwards. Here, the inner surface of the inclined hole 210 and the outer surface of the inclined portion 141 are formed in a spherical shape based on its own center, so that the fixture 200 may ascend or descend smoothly. Afterwards, when the fixture 200 moves downwards to a certain height, the protrusion portion 230 and the key portion 330 are disengaged, and the fixture 200 and shaft 500 are able to rotate.

In addition, in the state where the fixture 200 is lowered by the inclined portion 141, the seatback must be adjustable through the recliner. At this time, the fixture 200 may be rotated by the rotating portion 142 extending downwards from the pressing portion 140. Unlike the inclined portion 141, since the rotating portion 142 does not have an inclined surface, it may press the fixture 200 laterally to support the same. Therefore, the fixture 200 may be rotated without moving downwards.

Figure 5:
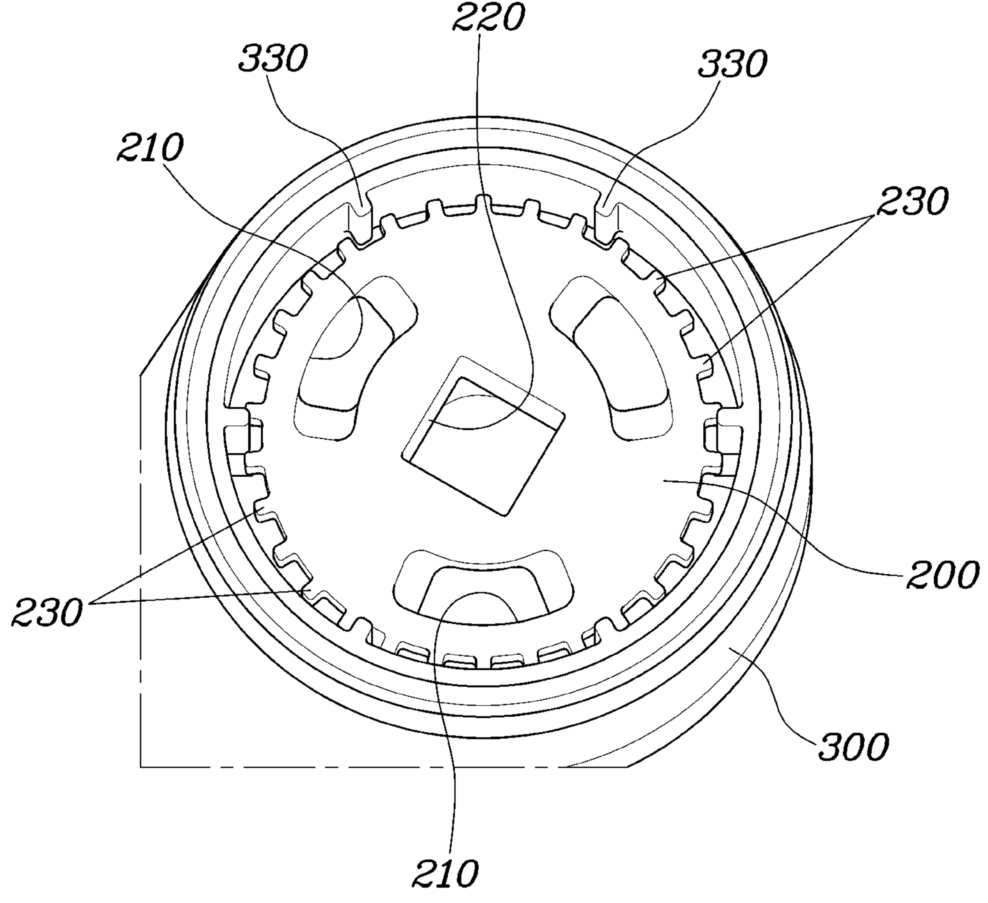
FIG. 5 is a diagram illustrating a state in which a protrusion portion is engaged with a key portion to be prevented from rotating according to an embodiment of the present disclosure.

FIG. 5 is a diagram illustrating a state in which a protrusion portion 230 of a fixture 200 is engaged with a key portion 330 to be prevented from rotating according to an embodiment of the present disclosure.

Referring to FIG. 5, when no rotational force is applied to the release lever 100 in the state in which the fixture 200 is lowered, the fixture 200 may return upwards to its original position so that the protrusion portion 230 and key portion 330 are engaged to prevent rotation thereof. Contrary to the case where the forward input of rotational force is applied from the outside, when a reverse input of rotational force is applied through the shaft 500, the fixture 200 and shaft 500 do not rotate while the protrusion portion 230 and the key portion 330 are engaged. To this end, when the rotational force is removed in the state where the fixture 200 is pressed downwards by the release lever 100, only the elastic force of the spring 400 exists, so the elastic force of the spring 400 pushes the fixture 200 upwards. At this time, the inclined hole 210 slides through the pressing portion 140 of the release lever 100, and the fixture 200 moves upwards so that the protrusion portion 230 and the key portion 330 are engaged. Therefore, when an external force is applied to the shaft 500 in the state where the protrusion portion 230 is engaged with the key portion 330, the rotation of the fixture 200 may be prevented, thereby preventing the shaft 500 from rotating. Through this, the brake device of the recliner may perform locking or unlocking using the engagement and disengagement of the protrusion portion 230 and the key portion 330 in a situation where external force is reversely input.

Hereinafter, the shapes of the release lever 100 and fixture 200 in order for the release lever 100 to preferentially rotate the shaft 500 before the engagement of the protrusion portion 230 and the key portion 330 is released when rotational force is applied from the outside of the release lever 100 will be described.

Figure 6:
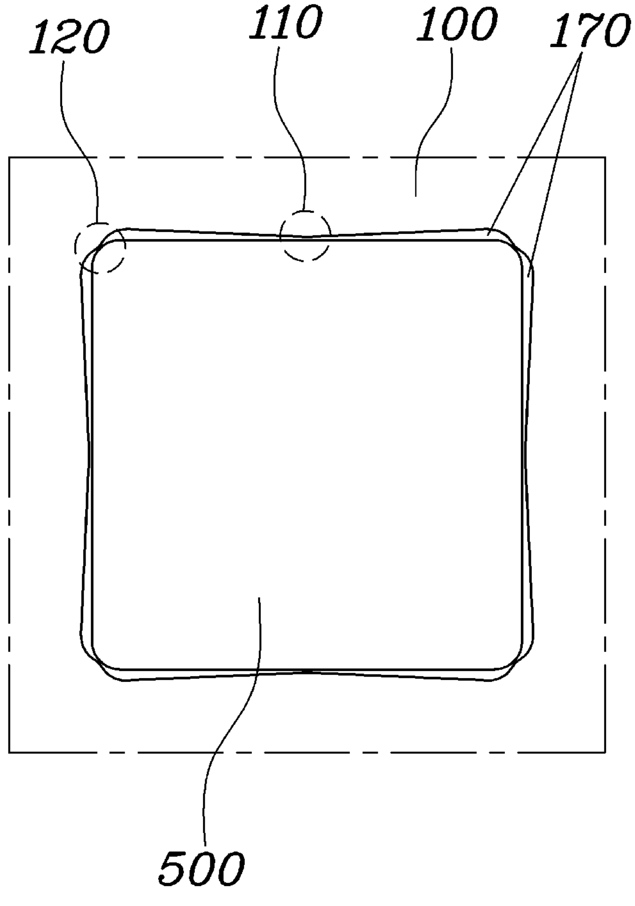
FIG. 6 and FIG. 7 are diagrams illustrating the shapes of a release lever and a fixture through which a shaft penetrates according to an embodiment of the present disclosure.
Figure 7:
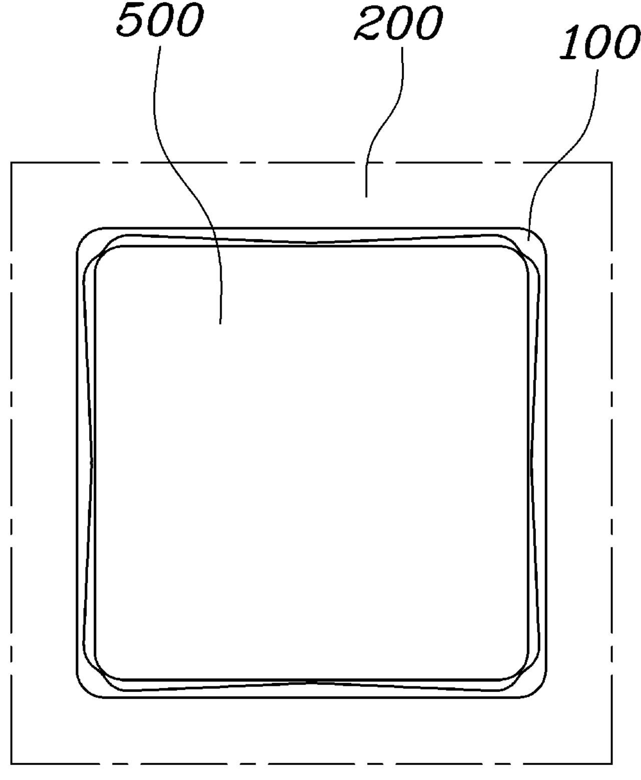

FIG. 6 and FIG. 7 are diagrams illustrating the shapes of a release lever 100 and a fixture 200 through which a shaft 500 penetrates according to an embodiment of the present disclosure.

Referring to FIG. 6, first, a rotation hole 130 may be formed in the center of the release lever 100 to allow the shaft 500 to pass therethrough. The shaft 500 sequentially penetrates the rotation hole 130, the fixing hole 220, and the through-hole 340 based on the outside of the vehicle seat. At this time, when rotational force is applied from the outside, the inner surface of the rotation hole 130 presses the outer surface of the shaft 500 such that the shaft 500 rotates. The rotation hole 130 may be formed such that the pressed surface thereof matches the shaft 500, so that the inner surface of the rotation hole 130 may be pressed by the outer surface of the shaft 500 at exact positions thereof. Since the shaft 500 is formed in a rectangular shape with rounded corners, the rotation hole 130 may also be formed in a rectangular shape having a different size therefrom to enable rotation of the shaft 500 at a certain angle. As described above, the configuration in which the inner surface of the release lever 100 matches the outer surface of the shaft 500 when the release lever 100 rotates may improve the locking force of the recliner.

More specifically, the shape of the inner surface of the release lever 100 may be described as follows. The central portion 110 of each side of the release lever 100 may be formed to protrude toward the shaft 500, and the corner 120 of each side thereof may be formed to protrude toward the shaft 500. Regarding the shape of the inner surface of the release lever 100 as a square, the central part 110 and corner 120 of each side have a shape that protrudes toward the shaft 500. Through this shape, a movement allowance space 170 where the shaft 500 is able to rotate may be provided, and when rotational force is applied from the outside, the shaft 500 may rotate in the movement allowance space 170 so that the position of the shaft 500 may be regulated within the inner side of the release lever 100. As the position of the shaft 500 is regulated, the inner surface of the rotation hole 130 comes into contact with the shaft 500 in the state in which the fixture 200 is stationary. Accordingly, when rotational force is applied from the outside, the shaft 500 rotates relative to the fixture 200.

Referring to FIG. 7, each side of the fixture 200 may be arranged to be spaced apart from each side of the shaft 500. The fixing hole 220 of the fixture 200 may be arranged parallel to the outer surface of the shaft 500. In addition, since the fixing hole 220 of the fixture 200 is not formed in a protruding shape like the release lever 100, when rotational force is applied from the outside, the shaft 500 rotates to come into contact with the rotation hole 130 of the release lever 100 and then comes into contact with the fixing hole 220 of the fixture 200 so that the fixture 200 moves downwards to release the engagement of the protrusion portion 230 and the key portion 330. On the other hand, when external pressure is applied to the shaft 500, the shaft 500 may come into contact first with the rotation hole 130 of the release lever 100 in the state in which the fixture 200 is stationary, and the protrusion portion 230 may engage with the key portion 330 to prevent the rotation of the shaft 500.

Based on the above-described brake device of a recliner for a vehicle seat, changes in the rotation angles of the release lever 100, the fixture 200, and the shaft 500 according to the embodiment will be described with reference to FIG. 8 and FIG. 9.

Figure 8:
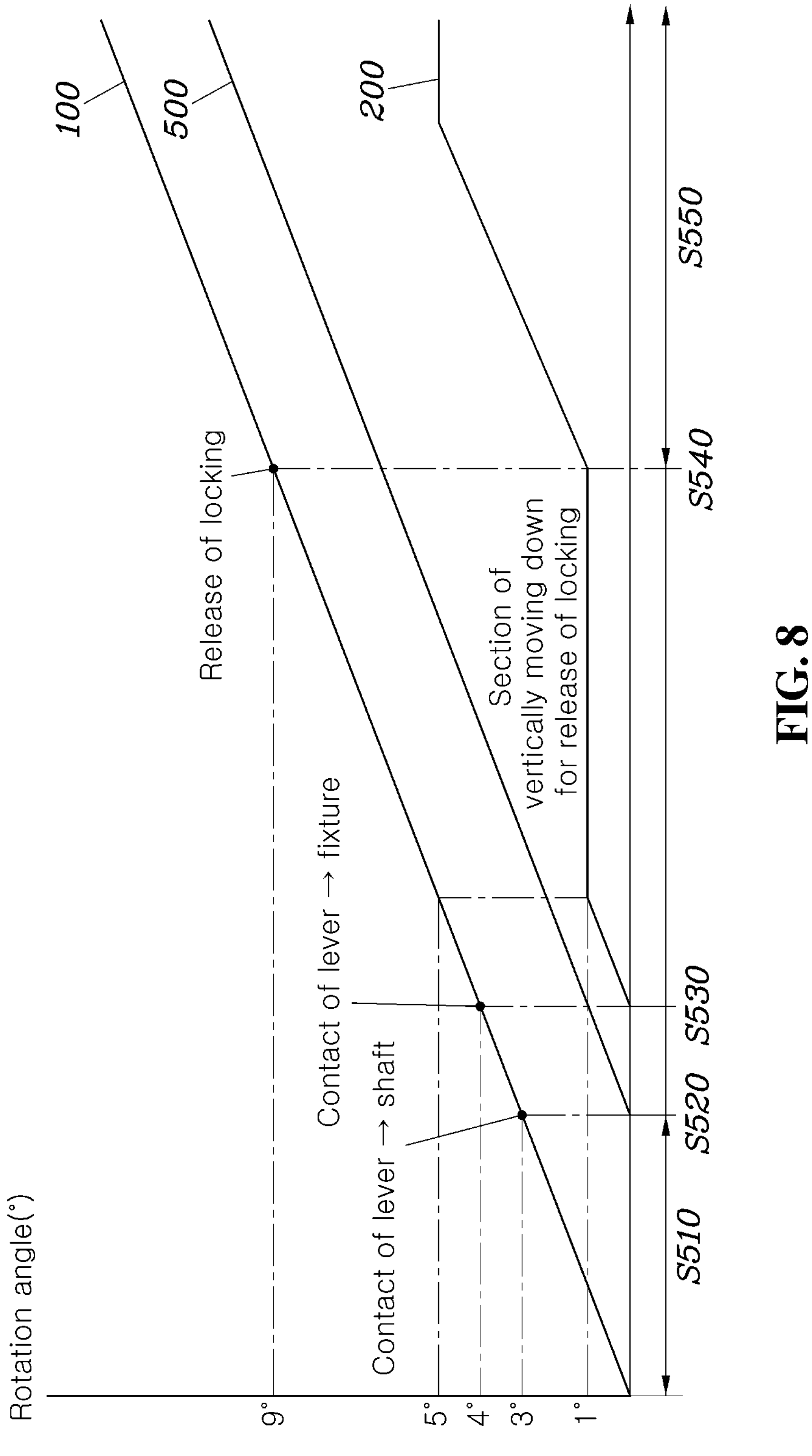
FIG. 8 and FIG. 9 are graphs showing a change in rotation angle of each component over time when rotational force is applied to the release lever from the outside and when external pressure is applied to the shaft, respectively, according to an embodiment of the present disclosure.
Figure 9:
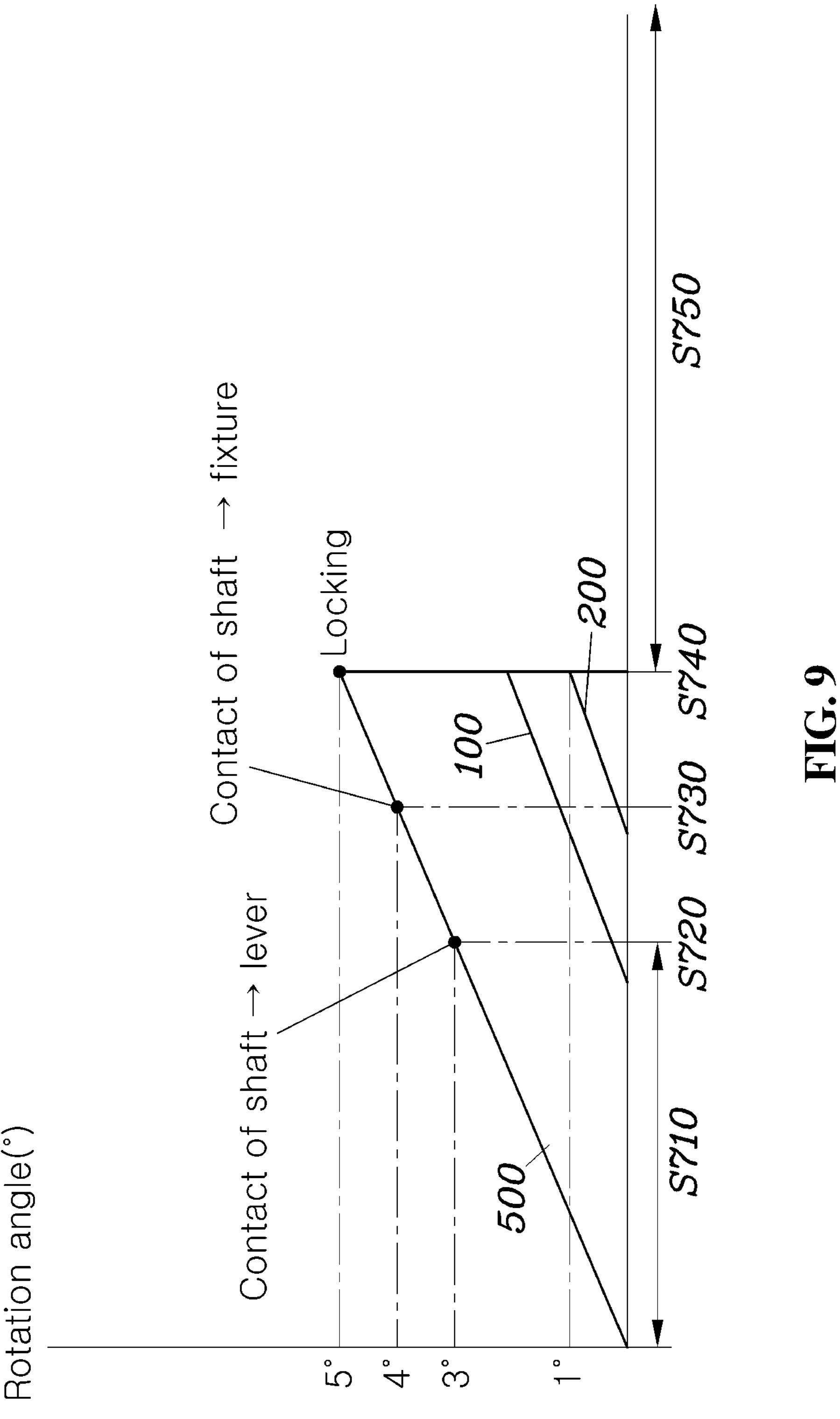

FIG. 8 and FIG. 9 are graphs showing a change in rotation angle of each component over time when rotational force is applied to the release lever 100 from the outside and when external pressure is applied to the shaft 500, respectively, according to an embodiment of the present disclosure.

FIG. 8 shows a forward input state in which rotational force is applied to the release lever 100 from the outside. In the forward input state, the rotation angle of the release lever 100 increases in proportion to the rotational force applied from the outside. First, a rotational force may be applied to the release lever 100 from the outside so that the release lever 100 may rotate in the forward direction (S510). When the release lever 100 rotates in the forward direction to reach a certain angle (3 degrees), the release lever 100 comes into contact with the shaft 500 so that the shaft 500 rotates relative to the fixture 200 (S520). Thereafter, when the release lever 100 rotates in the forward direction to reach a certain angle (4 degrees), the release lever 100 comes into contact with the fixture 200 (S530). Afterwards, as the release lever 100 rotates in the forward direction, the fixture 200 also rotates by a certain angle (1 degree), and when the release lever 100 rotates, the inclined portion 141 of the pressing portion 140 presses the side end of the inclined hole 210 so that the fixture 200 moves down. Afterwards, when the release lever 100 rotates in the forward direction to reach a certain angle (9 degrees), the protrusion portion 230 is separated downwards from the key portion 330 so that the protrusion portion 230 and the key portion 330 are disengaged, thereby enabling the fixture 200 and the shaft 500 to rotate (S540). Afterwards, as the release lever 100 rotates, the shaft 500 also rotates so that the recliner of the vehicle seat operates normally (S550).

FIG. 9 shows a reverse input state, contrary to the above-mentioned state, in which external pressure is applied to the shaft 500. In the reverse input state, the rotation angle of the shaft 500 increases in proportion to the external pressure applied. First, external pressure is applied to the shaft 500 so that the shaft 500 may rotate in the reverse direction (S710). When the shaft 500 rotates in the reverse direction to reach a certain angle (3 degrees), the shaft 500 comes into contact with the release lever 100 so that the release lever 100 rotates together with the shaft 500 (S720). Afterwards, when the shaft 500 rotates in the reverse direction to reach a certain angle (4 degrees), the shaft 500 comes into contact with the fixture 200 (S730). Afterwards, as the shaft 500 rotates in the reverse direction, the fixture 200 also rotates by a certain angle (1 degree), and when the rotation angle of the shaft 500 reaches a certain angle (5 degrees), the protrusion portion 230 engages with the key portion 330 so as to prevent the rotation of the fixture 200 and shaft 500, thereby maintaining the locked state (S750). The certain angles described above are only examples for convenience of explanation, so it is obvious to those skilled in the art that the certain angles may vary depending on the settings of the device.

According to the embodiments of the present disclosure described above, it is possible to enable the rotation of the recliner when a forward input of rotational force is applied to the release lever and prevent the rotation of the recliner when a rotational force is applied to the shaft in the state in which the vehicle seat is fixed, thereby improving locking force.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A brake device of a recliner for a vehicle seat, the brake device comprising:

a housing having a through-hole through which a shaft of a seat recliner passes, an accommodation space formed therein, and a key portion formed toward an inside thereof;

a fixture disposed in the accommodation space of the housing, through which the shaft penetrates, supported upwards by a spring, having a protrusion portion formed on an outer side thereof, and configured to be prevented from rotating by engagement of the protrusion portion and the key portion while being supported upwards; and a release lever installed above the fixture to be coupled to the shaft and configured to preferentially rotate, when a rotational force is applied from an outside, the shaft and press the fixture downwards to release the engagement of the protrusion portion and the key portion, thereby enabling rotation of the shaft and the fixture, wherein a rotation hole is defined in a center of the release lever to allow the shaft to pass therethrough, and wherein the rotation hole is defined in a rectangular shape having a different size from the shaft to enable the rotation of the shaft at an angle.

2. The brake device of claim 1, wherein a central portion of each side of the rectangular shape of the release lever is formed to protrude toward a center of the rotation hole.

3. The brake device of claim 1, wherein corners of respective the rectangular shape of the release lever are formed to protrude toward a center of the rotation hole.

4. The brake device of claim 1, wherein the rotation hole of the release lever, when the rotational force is applied from the outside, comes into contact with the shaft while the fixture is stationary such that the shaft rotates relative to the fixture.

5. The brake device of claim 1, wherein the shaft, when external pressure is applied to the shaft, preferentially comes into contact with the rotation hole of the release lever while the fixture is stationary, and then the protrusion portion engages with the key portion to be prevented from rotating.

6. A brake device of a recliner for a vehicle seat, the brake device comprising:

a housing having a through-hole through which a shaft of a seat recliner passes, an accommodation space formed therein, and a key portion formed toward an inside thereof;

a fixture disposed in the accommodation space of the housing, through which the shaft penetrates, supported upwards by a spring, having a protrusion portion formed on an outer side thereof, and configured to be prevented from rotating by engagement of the protrusion portion and the key portion while being supported upwards; and a release lever installed above the fixture to be coupled to the shaft and configured to preferentially rotate, when a rotational force is applied from an outside, the shaft and press the fixture downwards to release the engagement of the protrusion portion and the key portion, thereby enabling rotation of the shaft and the fixture, wherein each side of a rotation hole defined in a center of the release lever is provided with a movement allowance space where the shaft is movable, the shaft passing through the rotation hole, and wherein when the rotational force is applied from the outside, the shaft rotates into the movement allowance space to be regulated in a position of the shaft.

7. The brake device of claim 1, wherein each side of the fixture is spaced apart from each side of the shaft.

8. The brake device of claim 1, wherein a plurality of key portions protrude inwards from an inner circumferential surface of the housing and are spaced apart from each other in a circumferential direction thereof.

9. The brake device of claim 1, wherein a pressing portion extends downwards from the release lever, and wherein when the release lever rotates, the pressing portion presses the fixture downwards to move the fixture downwards.

10. The brake device of claim 9, wherein a side end of the pressing portion comes into contact with the fixture, wherein an inclined portion is formed on the side end of the pressing portion so as to become narrower in width from top to bottom, and wherein the fixture is pressed by the inclined portion of the pressing portion to move downwards.

11. The brake device of claim 10, wherein an inclined hole is formed in the fixture, wherein the pressing portion is configured to be inserted into the inclined hole, and wherein when the release lever rotates in a state in which the pressing portion is inserted into the inclined hole, the inclined portion of the pressing portion presses a side end of the inclined hole to move the fixture downwards.

12. The brake device of claim 9, wherein the pressing portion presses the fixture downwards such that the protrusion portion is released downwards from the key portion, thereby enabling the rotation of the fixture and the shaft.

13. The brake device of claim 9, wherein a rotating portion is formed to extend downwards from the pressing portion of the release lever, and wherein the fixture is pressed by the pressing portion of the release lever to be lowered and rotates by being pressed by the rotating portion in a lowered state.

14. A brake device of a recliner for a vehicle seat, the brake device comprising:

a housing having a through-hole through which a shaft of a seat recliner passes, an accommodation space formed therein, and a key portion formed toward an inside thereof;

a fixture disposed in the accommodation space of the housing, through which the shaft penetrates, supported upwards by a spring, having a protrusion portion formed on an outer side thereof, and configured to be prevented from rotating by engagement of the protrusion portion and the key portion while being supported upwards; and a release lever installed above the fixture to be coupled to the shaft and configured to preferentially rotate, when a rotational force is applied from an outside, the shaft and press the fixture downwards to release the engagement of the protrusion portion and the key portion, thereby enabling rotation of the shaft and the fixture, wherein a rotation hole is defined in a center of the release lever to allow the shaft to pass therethrough, and wherein the shaft contacts the rotation hole at a plurality of spaced points on the rotation hole.

* * * * *